United States Patent
Li et al.

(10) Patent No.: US 10,436,611 B2
(45) Date of Patent: Oct. 8, 2019

(54) ROTATION ANGLE MEASURING APPARATUS AND MEASURING METHOD

(71) Applicant: Siemens Aktiengesellschaft, Munich (DE)

(72) Inventors: Ming Li, Shanghai (CN); Yan Ling Lin, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 51 days.

(21) Appl. No.: 15/311,568

(22) PCT Filed: Feb. 26, 2016

(86) PCT No.: PCT/EP2016/054116
§ 371 (c)(1),
(2) Date: Nov. 16, 2016

(87) PCT Pub. No.: WO2016/155956
PCT Pub. Date: Oct. 6, 2016

(65) Prior Publication Data
US 2018/0010929 A1    Jan. 11, 2018

(30) Foreign Application Priority Data

Mar. 31, 2015 (CN) .......................... 2015 1 0150094

(51) Int. Cl.
*G01D 5/12* (2006.01)
*G01D 5/241* (2006.01)
(Continued)

(52) U.S. Cl.
CPC ............. *G01D 5/2415* (2013.01); *G01D 5/12* (2013.01); *G01D 5/145* (2013.01); *G01D 5/2451* (2013.01);
(Continued)

(58) Field of Classification Search
CPC .... G01D 5/145; G01D 5/2451; G01D 5/2415; G01D 5/12; G01D 5/142; G01D 5/24476; G01D 5/2458; G01D 11/245
See application file for complete search history.

(56) References Cited

U.S. PATENT DOCUMENTS

| 8,239,161 B2 | 8/2012 | Schneider et al. |
| 2004/0070392 A1* | 4/2004 | Hahn .................. G01D 5/04 |
| | | 324/207.22 |

(Continued)

FOREIGN PATENT DOCUMENTS

| CN | 102798405 | 11/2012 |
| CN | 102798405 A | 11/2012 |

(Continued)

OTHER PUBLICATIONS

Japanese Office Action and English translation thereof dated Nov. 30, 2018.

(Continued)

*Primary Examiner* — Gregory J Toatley, Jr.
*Assistant Examiner* — Lynda Dinh
(74) *Attorney, Agent, or Firm* — Harness, Dickey & Pierce, P.L.C.

(57) ABSTRACT

A rotation angle measuring apparatus and method are provided for measuring a rotation angle of a moving disk relative to a stationary disk, the moving disk being configured to rotate about an axis and the stationary disk being arranged opposite the moving disk. A magnet is arranged on the moving disk. A first magnetic sensor is arranged on the stationary disk, the first magnetic sensor generating an angle signal under the action of the magnet as the moving disk rotates. An incremental rotation angle of the moving disk is determined on the basis of an output of the receiving region, a period of the static electric field is determined on the basis of an angle signal generated by the first magnetic sensor, and (Continued)

an absolute rotation angle of the moving disk is determined on the basis of the period of the static electric field and the incremental rotation angle.

20 Claims, 7 Drawing Sheets

(51) Int. Cl.
    *G01D 5/245*     (2006.01)
    *G01D 5/244*     (2006.01)
    *G01D 5/14*     (2006.01)

(52) U.S. Cl.
    CPC ....... *G01D 5/2458* (2013.01); *G01D 5/24476* (2013.01)

(56) References Cited

U.S. PATENT DOCUMENTS

| | | | |
|---|---|---|---|
| 2008/0036454 A1* | 2/2008 | Landrieve | F16C 41/007 324/207.25 |
| 2009/0091336 A1 | 4/2009 | Al-Rawl | |
| 2013/0218517 A1* | 8/2013 | Ausserlechner | G01B 7/30 702/151 |
| 2015/0070001 A1* | 3/2015 | Villaret | G01D 5/145 324/207.2 |
| 2015/0130450 A1* | 5/2015 | Gehringer | G01D 5/145 324/207.25 |

FOREIGN PATENT DOCUMENTS

| | | |
|---|---|---|
| CN | 103528605 A | 1/2014 |
| CN | 104075740 A | 10/2014 |
| EP | 0413922 A1 | 2/1991 |
| EP | 2527796 A2 | 11/2012 |
| JP | S53108379 U | 8/1978 |
| JP | S5739367 U | 3/1982 |
| JP | 2001201310 A | 7/2001 |
| JP | 2010164553 A | 7/2010 |

OTHER PUBLICATIONS

International Search Report and Written Opinion dated May 2, 2016.

* cited by examiner

ROTATION ANGLE MEASURING APPARATUS AND MEASURING METHOD

PRIORITY STATEMENT

This application is the national phase under 35 U.S.C. § 371 of PCT International Application No. PCT/EP2016/054116 which has an International filing date of Feb. 26, 2016, which designated the United States of America and which claims priority to Chinese patent application number CN 201510150094.5 filed Mar. 31, 2015, the entire contents of which are hereby incorporated herein by reference.

FIELD

The present application generally relates to the field of rotation angle measurement, in particular to an absolute rotation angle measuring apparatus. The present application also generally relates to an absolute rotation angle measuring method.

BACKGROUND

A rotation angle measuring apparatus, also called a rotary encoder, is a type of apparatus used to measure angles and rotation speeds, and is widely used in many fields at present, e.g. can be used to measure electric machine speed or for position control systems, etc. According to the principle by which detection is carried out, rotary encoders can be divided into optical encoders, magnetic encoders and capacitive encoders, etc. Capacitive rotary encoders are more precise and more robust than optical and magnetic encoders.

A capacitive rotary encoder in the prior art comprises a moving disk (also called a rotor) and a stationary disk (also called a stator). The moving disk can rotate about an axis (e.g. a rotation axis of a rotating component such as an electric machine), so as to generate a rotation angle relative to the stationary disk. The moving disk comprises a reflecting region, while the stationary disk comprises an emitting region and a receiving region; a static electric field can be formed between the emitting region and the receiving region on the stationary disk, and the static electric field so formed is modulated by the reflecting region on the moving disk as the moving disk rotates. Thus, based on an output of the receiving region on the stationary disk, the rotation angle of the moving disk can be determined. The reflecting region on the moving disk generally has a periodic shape, e.g. a shape such as a repeating sine, cosine or triangular wave. As the moving disk rotates, the static electric field formed between the emitting region and the receiving region on the stationary disk is modulated by the reflecting region with the periodic shape on the moving disk, and correspondingly develops a periodic variation, with each repeating shape of the reflecting region representing one period of the static electric field. By determining the angle through which the moving disk rotates in one period of the static electric field, the incremental rotation angle of the moving disk (i.e. the rotation angle of the moving disk relative to each period starting point) can be determined. Furthermore, by determining the initial position of the moving disk, the absolute rotation angle of the moving disk can be determined (i.e. the actual rotation angle of the moving disk relative to a zero point).

In different application fields, it is sometimes necessary to determine the absolute rotation angle of the moving disk in one circle, and sometimes it is necessary to be able to determine a multiple-circle rotation angle of the moving disk.

SUMMARY

An embodiment of the present invention provides a rotation angle measuring apparatus and method, which are capable of determining an absolute rotation angle of a moving disk in one circle, with a simple and compact structure, and good measurement precision and robustness.

The rotation angle measuring apparatus according to at least one embodiment of the present invention comprises:
a moving disk, capable of rotating about an axis, and comprising:
a reflecting region, having a periodically varying shape; a stationary disk, arranged opposite the moving disk, and comprising:
an emitting region;
a receiving region, being able to form a static electric field with the emitting region, the static electric field being modulated by the reflecting region and hence periodically varying as the moving disk rotates;
a magnet, arranged on the moving disk;
a first magnetic sensor, arranged on the stationary disk, and generating an angle signal under the action of the magnet as the moving disk rotates; and
a signal processing circuit, which determines an incremental rotation angle of the moving disk on the basis of an output of the receiving region, determines a period of the static electric field on the basis of the angle signal generated by the first magnetic sensor, and determines an absolute rotation angle of the moving disk on the basis of the period of the static electric field and the incremental rotation angle.

In the rotation angle measuring method according to at least one embodiment of the present invention, the rotation angle means a rotation angle of a moving disk relative to a stationary disk; the moving disk can rotate about an axis, and comprises: a reflecting region, having a periodically varying shape; the stationary disk is arranged opposite the moving disk, and comprises: an emitting region and a receiving region, the receiving region being able to form a static electric field with the emitting region, the static electric field being modulated by the reflecting region and hence periodically varying as the moving disk rotates; a magnet is arranged on the moving disk; a first magnetic sensor is arranged on the stationary disk, the first magnetic sensor generating an angle signal under the action of the magnet as the moving disk rotates; the method comprises: determining an incremental rotation angle of the moving disk on the basis of an output of the receiving region, determining a period of the static electric field on the basis of an angle signal generated by the first magnetic sensor, and determining an absolute rotation angle of the moving disk on the basis of the period of the static electric field and the incremental rotation angle.

At least one embodiment of the present invention provides a multiple-circle absolute rotation angle measuring apparatus and method, which are capable of determining a multiple*circle absolute rotation angle of a moving disk, with a simple and compact structure, and good measurement precision and robustness.

Furthermore, the apparatus according to at least one embodiment of the present invention comprises:
at least one second magnetic sensor, the second magnetic sensors being arranged on the stationary disk so as to be spaced apart by a set angle, and each generating a pulse signal under the action of the magnet as the moving disk rotates, the signal processing circuit also determining a rotation direction of the moving disk on the basis of signals generated by two magnetic sensors, the two magnetic sensors being two selected from the first magnetic sensor and the at least one second magnetic sensor; and determining the number of circles of rotation of the moving disk on the basis of the rotation direction of the moving disk and a pulse signal generated by one of the at least one second magnetic sensor.

Furthermore, in the method according to at least one embodiment of the present invention, at least one second magnetic sensor is also arranged on the stationary disk, the second magnetic sensors being arranged to be spaced apart by a set angle, and each generating a pulse signal under the action of the magnet as the moving disk rotates; the method also comprises:

determining a rotation direction of the moving disk on the basis of signals generated by two magnetic sensors, the two magnetic sensors being two selected from the first magnetic sensor and the at least one second magnetic sensor; and determining the number of circles of rotation of the moving disk on the basis of the rotation direction of the moving disk and a pulse signal generated by one of the at least one second magnetic sensor.

BRIEF DESCRIPTION OF THE DRAWINGS

The object, features and effects of the present invention are explained in detail below by way of particular embodiments according to the present invention, in conjunction with the accompanying drawings. These explanations are merely given by way of example, and are not intended to limit the scope of protection of the present invention.

DETAILED DESCRIPTION OF EXAMPLE EMBODIMENTS

Figure 1:
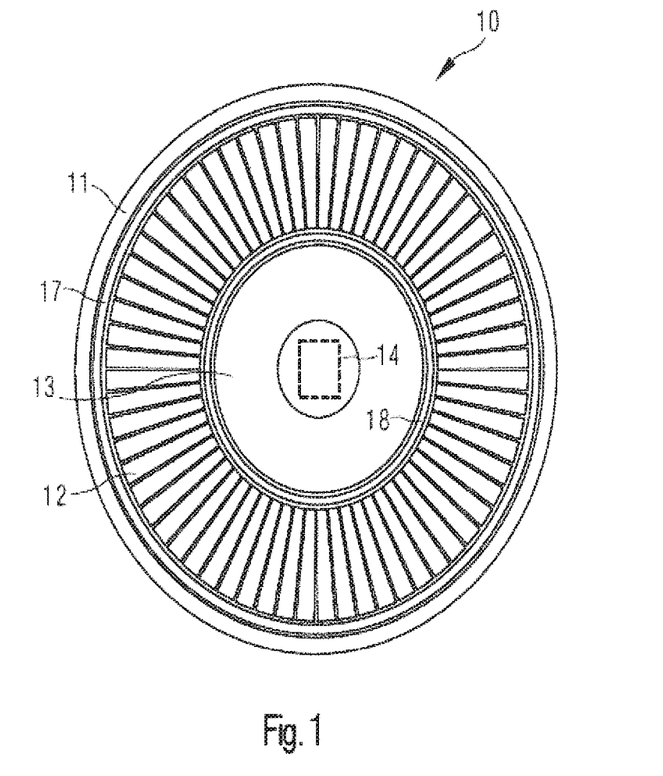
FIG. 1 shows a stationary part of a rotation angle measuring apparatus in embodiment one of the present application.
Figure 2:
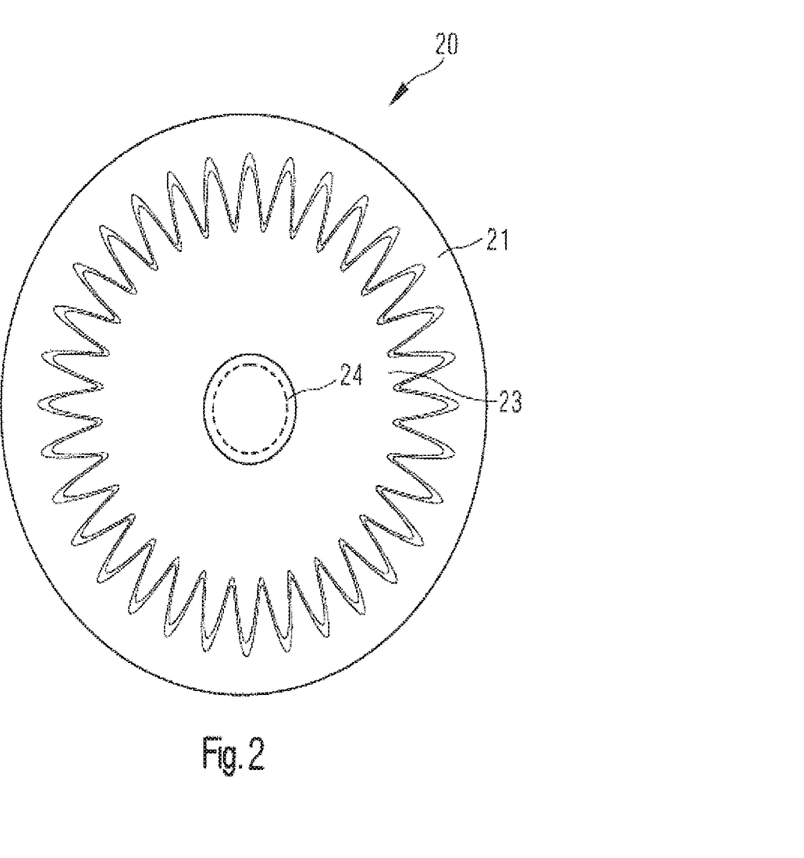
FIG. 2 shows a rotating part of the rotation angle measuring apparatus in embodiment one of the present application.

Embodiment one of the apparatus according to the present application is explained below in conjunction with FIGS. 1 and 2, wherein FIG. 1 shows a stationary part of a rotation angle measuring apparatus according to the present invention, and FIG. 2 shows a rotating part of the rotation angle measuring apparatus.

As FIG. 1 shows, the stationary part of the rotation angle measuring apparatus comprises a stationary disk 10 and a first magnetic sensor 14 arranged on the stationary disk 10. The stationary disk 10 comprises an emitting region formed of multiple electrodes 12, and a pair of differential receiving regions formed by electrodes 11 and 13. By providing an excitation signal to the multiple electrodes 12, a static electric field can be formed between the emitting region and each receiving region. The various electrodes 12, 11 and 13 are electrically isolated from one another (e.g. by gaps). To increase the degree of electrical isolation, and avoid crosstalk between the emitting region and each receiving region, conductor rings 17 and 18 may be further arranged between the emitting region and the receiving region.

As FIG. 2 shows, the rotating part of the rotation angle measuring apparatus comprises a moving disk 20 and a magnet 24 arranged on the moving disk 20; the moving disk 20 can rotate about an axis (e.g. a rotation axis of an electric machine under test), thereby driving the magnet 24 to rotate therewith. The moving disk 20 comprises a pair of differential reflecting regions formed by electrodes 21 and 23. Electrodes 21 and 23 have periodically varying shapes which complement each other, and are electrically isolated from one another.

The stationary disk 10 and moving disk 20 are arranged opposite one another, such that the emitting region and receiving regions of the stationary disk 10 are opposite the reflecting regions of the moving disk 20. As the moving disk 20 rotates, static electric fields between the emitting region and receiving regions of the stationary disk 10 are modulated by the reflecting regions of the moving disk 20; specifically, a static electric field between the electrodes 12 of the emitting region and the electrode 11 of the receiving region is modulated by the reflecting region electrode 21, a static electric field between the electrodes 12 of the emitting region and the electrode 13 of the receiving region is modulated by the reflecting region electrode 23, and outputs of the electrodes 11 and 13 of the receiving region form a pair of differential signals of equal magnitude but opposite phase. Since the reflecting regions have a periodically varying shape, the static electric fields between the emitting region and the receiving regions also periodically vary as the moving disk 20 rotates; each repeating shape of the reflecting region represents one period of the static electric field, and the angle through which the moving disk 20 rotates in one period of the static electric field, i.e. the incremental rotation angle of the moving disk 20, can be determined according to the output of the receiving region.

By increasing the number of periods in the shape of the reflecting region of the moving disk 20 (i.e. the number of periods of the static electric field in one circle of rotation of the moving disk 20), the resolution and the precision of measurement of the incremental rotation angle can be increased. By way of the differential structure, using the difference value between output signals of the electrodes 11 and 13 of the receiving regions of the stationary disk 10, a useful signal component in the outputs of the receiving regions can be enhanced, reducing noise and thereby improving the precision of measurement.

The first magnetic sensor 14 on the stationary disk 10 is used to detect a magnetic field generated by the magnet 24 on the moving disk 20. As the moving disk 20 rotates, the magnetic field generated by the magnet 24 rotates therewith, and the first magnetic sensor 14 generates an angle signal under the action of the magnet 24, the angle signal indicating the angle through which the moving disk 20 rotates in one circle. The angle signal generated by the first magnet sensor 14 is used to determine the period of the static electric field; on the basis of the period of the static electric field and the incremental rotation angle of the moving disk 20, the absolute rotation angle of the moving disk 20 in one circle can be determined.

By way of the rotation angle measuring apparatus in embodiment one above, since the angle signal generated by the first magnetic sensor 14 is only used to determine the period of the static electric field, without being used directly to determine the absolute rotation angle of the moving disk 20, the requirements on sensitivity of the first magnetic sensor 14, linearity between the angle signal generated by the first magnetic sensor 14 and the magnetic field generated by the magnet 24, and precision of signal processing are all somewhat reduced, so that costs of the rotation angle measuring apparatus can be saved and the manufacturing cost can be reduced. Furthermore, as the incremental rotation angle of the moving disk 20 is determined by way of the outputs of the receiving regions, the advantages of a capacitive rotary encoder can be retained, giving the rotation angle measuring apparatus higher precision and robustness. By way of the differential structure, using the difference value between output signals of the electrodes 11 and 13 of the receiving regions, noises in the output signals can be made to offset each other, while the useful signal component is doubled, thereby further increasing the precision of measurement.

In addition, the period of the static electric field is determined by way of the angle signal generated by the first magnetic sensor 14, then the absolute rotation angle of the moving disk 20 in one circle is determined; the apparatus structure is simple and compact, and easy to implement. In addition to the necessity to determine the absolute rotation angle of the moving disk 20 in one circle, in application fields with stringent requirements on position such as those concerning safety, it is also necessary to be able to determine a multiple-circle absolute rotation angle of the moving disk 20. Embodiment two of the apparatus according to the present invention is explained below in conjunction with FIG. 3. Those parts of embodiment two which are the same as in embodiment one will not be repeated; the focus of the explanation will be on just the different parts of embodiment two.

Figure 3:
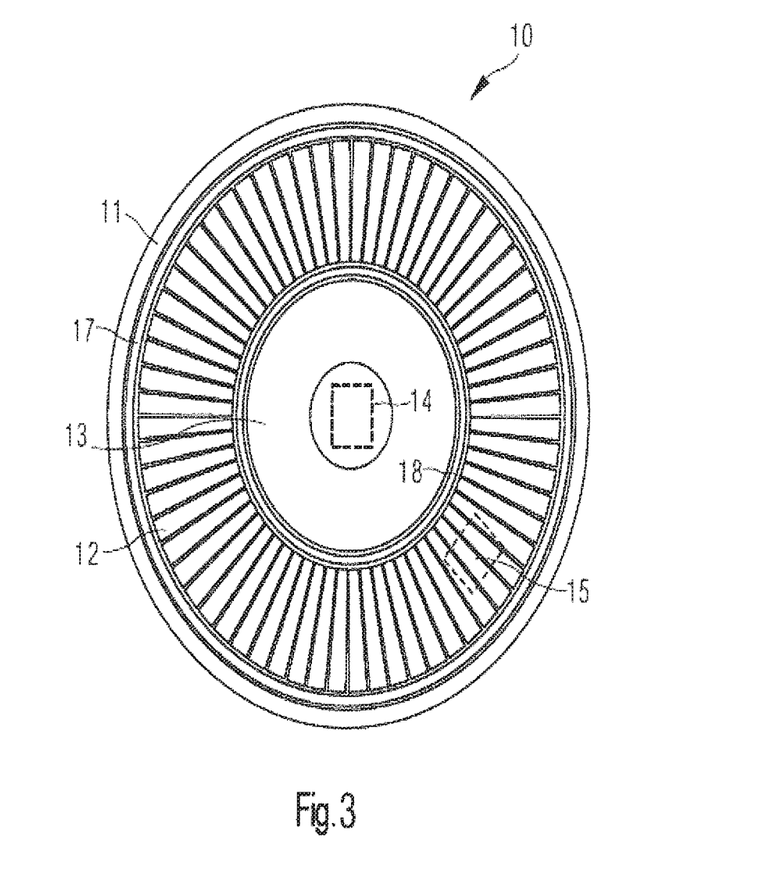
FIG. 3 shows a stationary part of a rotation angle measuring apparatus in embodiment two of the present application.

FIG. 3 shows the stationary part of the rotation angle measuring apparatus of embodiment two. The rotating part of the rotation angle measuring apparatus is the same as the rotating part in embodiment one, which can be seen in FIG. 2. As FIG. 3 shows, the stationary part of the rotation angle measuring apparatus comprises a stationary disk 10 and a first magnetic sensor 14 arranged on the stationary disk 10, just as shown in FIG. 1. In addition, the stationary part of the rotation angle measuring apparatus also comprises a second magnetic sensor 15. The second magnetic sensor 15 is arranged on the stationary disk 10, for generating a pulse signal under the action of the magnet 24 on the moving disk 20 as the moving disk 20 rotates; the form of the pulse signal is such that one or more pulses is/are generated for each circle of rotation of the moving disk 20. This can reflect the number of circles of rotation of the magnetic field of the magnet 24.

When it is necessary to determine the multiple-circle absolute rotation angle of the moving disk 20, it is necessary to be able to determine the number of circles through which the moving disk 20 has rotated, on the basis of having determined the absolute rotation angle of the moving disk 20 in one circle. In order to determine the number of circles of rotation of the moving disk 20, the rotation direction of the moving disk 20 must be determined. In embodiment two, the rotation direction of the moving disk 20 is determined according to signals generated by the first magnetic sensor 14 and the second magnetic sensor 15.

Figure 4:
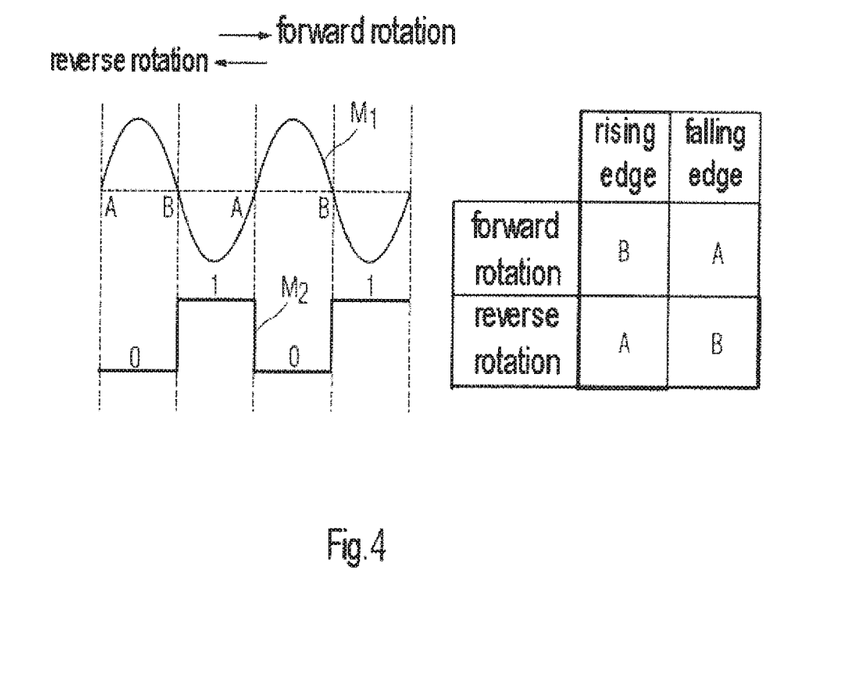
FIG. 4 shows signals generated by first and second magnetic sensors in embodiment two of the present application.

Referring to FIG. 4, during rotation of the moving disk 20, the first magnetic sensor 14 generates an angle signal, represented in FIG. 4 as a sine curve Mi; the second magnetic sensor 15 generates a pulse signal, the form of which is such that one pulse is generated for each circle of rotation of the moving disk 20, represented in FIG. 4 as a pulse sequence M2 with a duty cycle of 50%. By edge detection, a rising edge and/or falling edge of the pulse signal generated by the second magnetic sensor 15 can be learned. By combining this with an angle value, corresponding to the rising edge and/or falling edge, of the angle signal generated by the first magnetic sensor 14, the rotation direction of the moving disk 20 can be determined. For example, corresponding to a rising edge of the pulse signal generated by the second magnetic sensor 15, during forward rotation of the moving disk 20, the angle value of the angle signal generated by the first magnetic sensor 14 is B, and during reverse rotation of the moving disk 20, the angle value of the angle signal generated by the first magnetic sensor 14 is A; corresponding to a falling edge of the pulse signal generated by the second magnetic sensor 15, during forward rotation of the moving disk 20, the angle value of the angle signal generated by the first magnetic sensor 14 is A, and during reverse rotation of the moving disk 20, the angle value of the angle signal generated by the first magnetic sensor 14 is B.

On the basis of a pulse count of the pulse signal generated by the second magnetic sensor 15 and the rotation direction determined, the number of circles of rotation of the moving disk 20 can be determined. For example, for forward rotation of the moving disk 20, the pulse count of the pulse signal generated by the second magnetic sensor 15 is 1; for reverse rotation of the moving disk 20, the pulse count of the pulse signal generated by the second magnetic sensor 15 is -1; and summation is carried out in sequence. In order to ensure that the number of circles of rotation of the moving disk 20 is counted at the same position, counting of the pulses of the pulse signal generated by the second magnetic sensor 15 is set to be performed at a rising edge or a falling edge of the pulse signal. For example, during forward rotation of the moving disk 20, counting is performed at a falling edge of the pulse signal generated by the second magnetic sensor 15, and during reverse rotation of the moving disk 20, counting is performed at a rising edge of the pulse signal generated by the second magnetic sensor 15.

By way of the rotation angle measuring apparatus of embodiment two above, on the basis of having determined a single-circle absolute rotation angle of the moving disk 20, a multiple-circle absolute rotation angle thereof can be further determined. Moreover, the second magnetic sensor 15 is used to generate a pulse signal, and may be a magnetic sensing device with low power consumption, so as to lower the power consumption of the rotation angle measuring apparatus. In order to lower electrical energy consumption further, for example when a main power supply of the rotation angle measuring apparatus has been cut off and a battery is supplying electricity, an arrangement can be made to supply the first magnetic sensor 14 with electricity only when an angle signal is generated corresponding to a rising edge and/or a falling edge of the pulse signal generated by the second magnetic sensor 15. Embodiment three of the apparatus according to the present invention is explained below in conjunction with FIG. 5. The rotation angle measuring apparatus of embodiment three can determine a multiple-circle absolute rotation angle of the moving disk 20, and has lower power consumption. Those parts of embodiment three which are the same as in the embodiments above will not be repeated; the focus of the explanation will be on just the different parts thereof.

Figure 5:
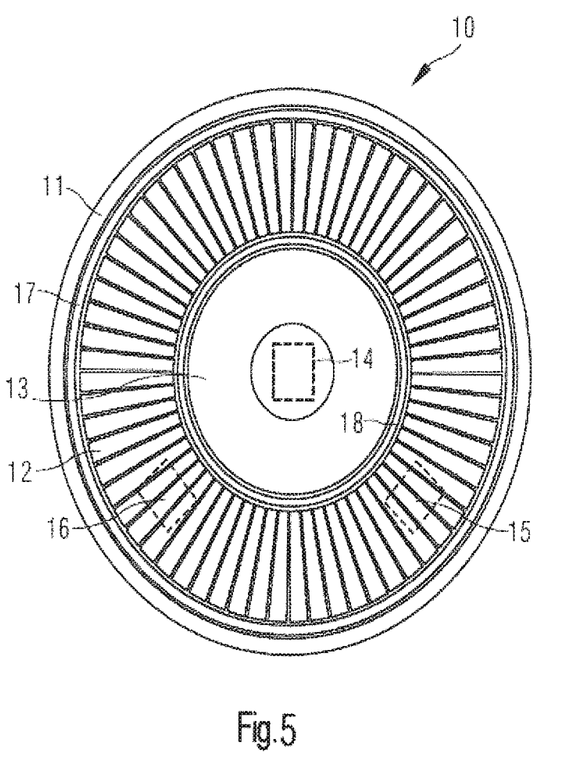
FIG. 5 shows a stationary part of a rotation angle measuring apparatus in embodiment three of the present application.

FIG. 5 shows the stationary part of the rotation angle measuring apparatus of embodiment three. The rotating part of the rotation angle measuring apparatus is the same as the rotating part in embodiment one, which can be seen in FIG. 2. As FIG. 5 shows, the stationary part of the rotation angle measuring apparatus comprises a stationary disk 10 and a first magnetic sensor 14 arranged on the stationary disk 10, just as shown in FIG. 1. In addition, the stationary part of the rotation angle measuring apparatus also comprises two second magnetic sensors 15 and 16. The second magnetic sensors 15 and 16 are arranged on the stationary disk 10 so as to be spaced apart by a set angle, and are respectively used for generating a pulse signal under the action of the magnet 24 on the moving disk 20 as the moving disk 20 rotates; the form of each pulse signal is such that one or more pulses is/are generated for each circle of rotation of the moving disk 20. This can reflect the number of circles of rotation of the magnetic field of the magnet 24.

Figure 6:
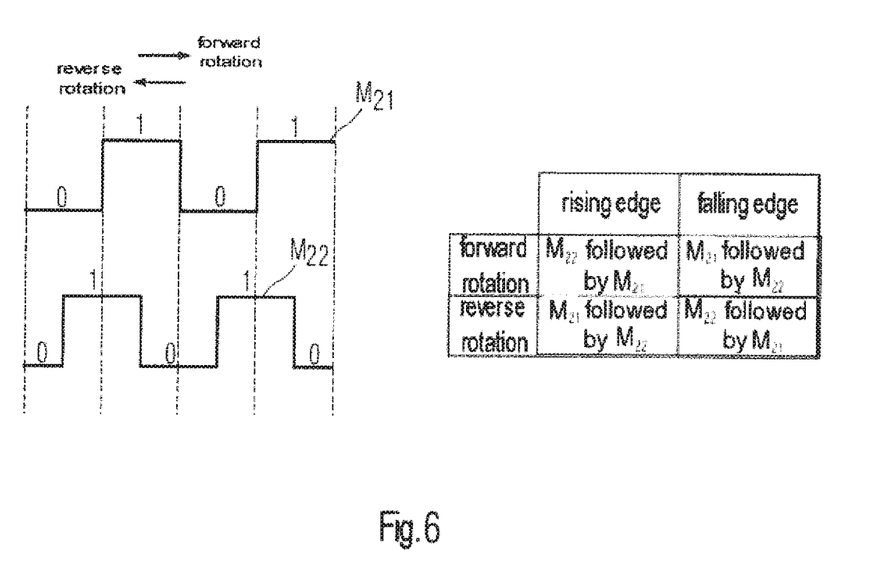
FIG. 6 shows signals generated by second magnetic sensors in embodiment three of the present application.

On the basis of having determined the absolute rotation angle of the moving disk 20 in one circle, it is necessary to determine the rotation direction of the moving disk 20 in order to determine the number of circles of rotation of the moving disk 20. In embodiment three, the rotation direction of the moving disk 20 is determined on the basis of the pulse signal generated by the second magnetic sensors 15 and 16. Referring to FIG. 6, during rotation of the moving disk 20, the second magnetic sensors 15 and 16 each generate a pulse signal; the form of each pulse signal is such that one pulse is generated for each circle of rotation of the moving disk 20, and the pulse signals are represented in FIG. 6 as pulse sequences M21 and M22 respectively, each with a duty cycle of 50%. Since the second magnetic sensors 15 and 16 are arranged to be spaced apart by a set angle, during rotation of the moving disk 20, the pulse signals generated by the second magnetic sensors 15 and 16 have a set order depending on the rotation direction of the moving disk 20. For example, based on rising edges of the pulse signals, during forward rotation of the moving disk 20, the order of the pulse signals generated by the second magnetic sensors 15 and 16 is 16 followed by 15 (M22 followed by M21), and during reverse rotation of the moving disk 20, the order of the pulse signals generated by the second magnetic sensors 15 and 16 is 15 followed by 16 (M21 followed by M22); based on falling edges of the pulse signals, during forward rotation of the moving disk 20, the order of the pulse signals generated by the second magnetic sensors 15 and 16 is 15 followed by 16 (M21 followed by M22), and during reverse rotation of the moving disk 20, the order of the pulse signals generated by the second magnetic sensors 15 and 16 is 16 followed by 15 (M22 followed by M21). Thus, on the basis of the order of the pulse signals generated by the second magnetic sensors 15 and 16, the rotation direction of the moving disk 20 can be determined. For example, by edge detection, rising edges and/or falling edges of the pulse signals generated by the second magnetic sensors 15 and 16 can be learned, and on the basis of the order of the rising edges and/or falling edges detected, the rotation direction of the moving disk 20 can be determined.

Based on a pulse count of the pulse signal generated by either one of the second magnetic sensors 15 and 16 and the rotation direction determined, the number of circles of rotation of the moving disk 20 can be determined. Embodiment two may be referred to for details of the specific operation of pulse counting, which are not repeated here.

By way of the rotation angle measuring apparatus of embodiment three above, a multiple-circle absolute rotation angle of the moving disk 20 can be determined. Moreover, the first magnetic sensor 14 only needs to be supplied with electricity by a main power supply when a single-circle absolute rotation angle of the moving disk 20 is determined, and counting of the number of circles of rotation of the moving disk 20 can be performed continuously by way of the pulse signals generated by the second magnetic sensors 15 and 16. The second magnetic sensors 15 and 16 may be magnetic sensing devices with low power consumption, so as to significantly reduce the power consumption of the rotation angle measuring apparatus.

Those skilled in the art should appreciate that although the second magnetic sensor is preferably a magnetic switch sensor in the above embodiments, the output signal thereof experiences a reversal of polarity when the magnetic field strength detected is greater than and/or lower than a set threshold, therefore the output is a pulse signal, with low power consumption. However, the present invention is not limited to this; when the second magnetic sensor outputs a continuous signal, for example outputs a sine signal in the same way as the first magnetic sensor, the pulse signal required can also be generated by conversion such as by a threshold circuit.

In the embodiments of the apparatus according to the present invention, the first magnetic sensor is preferably a magnetic angle sensor, for example a Hall sensor, giant magnetoresistance (GMDR) sensor, anisotropic magnetoresistance (AMR) sensor, tunnel magnetoresistance (TMR) sensor, etc.

The magnet 24 is preferably in the form of a disk, radially magnetized, and arranged on an axis of the moving disk 20. For example, the magnet 24 may be placed in a housing, the housing may be arranged at the axis of the moving disk 20, and the housing and moving disk 20 may be fixed on a rotation axis together by way of a fastening element. Thus, the moving disk 20 and the magnetic field generated by the magnet 24 can rotate coaxially. The first magnetic sensor 14 is preferably also arranged coaxially with the magnet 24, so that the angle signal generated by the first magnetic sensor 14 can directly indicate the angle through which the moving disk 20 has rotated. The second magnetic sensor 15 is preferably arranged to be spaced apart from the magnet 24 by a set distance in a radial direction, so that during rotation of the moving disk 20, the electric levels of the signal generated in the second magnetic sensor 15 by the magnetic field of the magnet 24 can differ more markedly, to make pulse detection and counting more accurate.

Embodiment four of the apparatus according to the present invention is explained below in conjunction with FIG. 7. The explanation of embodiment three may be referred to for details of the rotating part and stationary part of the rotation angle measuring apparatus of embodiment four. The focus of the explanation here will be on just a signal processing circuit of the rotation angle measuring apparatus.

The signal processing circuit is used for determining an incremental rotation angle of the moving disk 20 on the basis of outputs of the receiving regions of the stationary disk 10, determining a period of the static electric field on the basis of an angle signal generated by the first magnetic sensor 14, and determining an absolute rotation angle of the moving disk 20 on the basis of the period of the static electric field and the incremental rotation angle determined. Furthermore, the signal processing circuit also determines the rotation direction of the moving disk 20 on the basis of signals generated by two magnetic sensors, wherein the two magnetic sensors are the first magnetic sensor 14 and the second magnetic sensor 15, or the second magnetic sensors 15 and 16; and determines the number of circles of rotation of the moving disk 20 on the basis of the rotation direction of the moving disk 20 and a pulse signal generated by one of the second magnetic sensors 15 and 16. The signal processing circuit may be arranged on the stationary disk 10, or provided as a separate circuit board.

Figure 7:
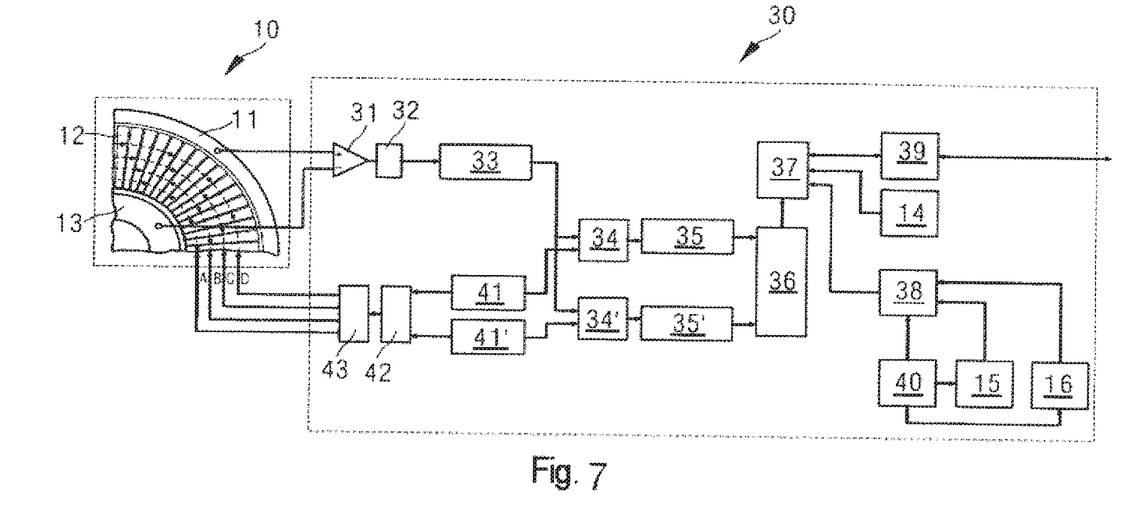
FIG. 7 shows a signal processing circuit of a rotation angle measuring apparatus in embodiment four of the present application.

In the signal processing circuit 30 shown in FIG. 7 (the various elements and connections thereof shown in the figure are merely intended to illustrate the signal flow direction, and do not reflect the physical positions of elements), output signals of the electrodes 11 and 13 of the receiving regions of the stationary disk 10 pass through an operational amplifier 31 which determines a difference value, which is then converted to a digital signal by analog-digital conversion 32; the digital signal undergoes band-pass filtering 33 to further filter out noise outside the band. After band-pass filtering, the digital signal passes through multipliers 34 and 34' with orthogonal carrier (sine and cosine) signals 41 and 41' respectively to undergo demodulation, and two orthogonal signals resulting from demodulation undergo low-pass filtering 35 and 35' respectively to obtain baseband signals. An in-phase branch and a quadrature branch of the baseband signals further undergo arctangent operation 36 to obtain an incremental rotation angle of the moving disk 20.

An absolute rotation angle determining unit 37 can determine an absolute rotation angle of the moving disk 20 in one circle according to the incremental rotation angle obtained and an angle signal generated by the first magnetic sensor 14.

Furthermore, a microprocessor 38 determines the rotation direction of the moving disk 20 on the basis of the order of pulse signals generated by the second magnetic sensors 15 and 16, and can then determine the number of circles of rotation of the moving disk 20 on the basis of the rotation direction determined and a pulse count of pulse signals generated by the second magnetic sensor 15 or 16.

The absolute rotation angle determining unit 37 can then determine a multiple-circle absolute rotation angle of the moving disk 20 on the basis of the absolute rotation angle of the moving disk 20 in one circle and the number of circles of rotation.

In order to be able to continuously record the number of circles of rotation of the moving disk 20 when a main power supply (not shown in FIG. 7 for the sake of conciseness) of the rotation angle measuring apparatus is cut off, the second magnetic sensors 15 and 16 and the microprocessor 38 may also be powered by a battery 40.

The multiple-circle absolute rotation angle of the moving disk 20 determined by the absolute rotation angle determining unit 37 may be converted by an interface unit 39 to a suitable signal format to be supplied to an upper level control system, e.g. an electric machine speed or position control system.

In addition, the signal processing circuit 30 may also comprise digital-analog conversion 42 and an operational amplifier 43, for subjecting orthogonal carrier signals 41 and 41' to digital-analog conversion and generating four orthogonal excitation signals A to D. The four orthogonal excitation signals are 0-degree, 90-degree, 180-degree and 270-degree sine signals respectively, to excite the electrodes 12 of the emitting region of the stationary disk 10. Each group of four electrodes 12 forms a group of emission electrodes, opposite one repeating shape of the receiving regions, and excited by the four orthogonal excitation signals A to D; an existing capacitive encoder may be referred to for details of the specific arrangement, which will not be described here.

Corresponding to the rotation angle measuring apparatus provided in the present invention, the present invention also provides a rotation angle measuring method, wherein the rotation angle way a rotation angle of a moving disk relative to a stationary disk; the moving disk can rotate about an axis, and comprises: a reflecting region, having a periodically varying shape; the stationary disk is arranged opposite the moving disk, and comprises: an emitting region and a receiving region, the receiving region being able to form a static electric field with the emitting region, the static electric field being modulated by the reflecting region and hence periodically varying as the moving disk rotates; a magnet is arranged on the moving disk; a first magnetic sensor is arranged on the stationary disk, the first magnetic sensor generating an angle signal under the action of the magnet as the moving disk rotates; the method comprises: determining an incremental rotation angle of the moving disk on the basis of an output of the receiving region, determining a period of the static electric field on the basis of an angle signal generated by the first magnetic sensor, and determining an absolute rotation angle of the moving disk in one circle on the basis of the period of the static electric field and the incremental rotation angle.

In order to further determine a multiple-circle absolute rotation angle of the moving disk, at least one second magnetic sensor is also arranged on the static disk, the second magnetic sensors being arranged to be spaced apart by a set angle, and each generating a pulse signal under the action of the magnet as the moving disk rotates, the method of the present invention also comprises: determining a rotation direction of the moving disk on the basis of signals generated by two magnetic sensors, the two magnetic sensors being two selected from the first magnetic sensor and the at least one second magnetic sensor; and determining the number of circles of rotation of the moving disk on the basis of the rotation direction of the moving disk and a pulse signal generated by one of the at least one second magnetic sensor.

In the method according to the present invention, in order to determine a multiple-circle absolute rotation angle of the moving disk, preferably the absolute rotation angle of the moving disk in one circle is determined only when a main power supply is turned on; and the incremental rotation angle and number of circles of rotation of the moving disk are determined continuously.

The relevant content in the above embodiments of the apparatus according to the present invention may be referred to for a detailed explanation of the method according to the present invention, and will not be repeated here.

Those skilled in the art should appreciate that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the various embodiments could also be suitably combined to form other embodiments capable of being understood by those skilled in the art.

The above embodiments are merely particular exemplary embodiments of the present invention, which are not intended to define the scope thereof. Any equivalent changes, modifications or combinations made by those skilled in the art without departing from the concept and principles of the present invention should be included in the scope of protection thereof.

The invention claimed is:

1. A rotation angle measuring apparatus, comprising:
a moving disk, configured to rotate about an axis, including a reflecting region comprising first electrodes on the moving disk and having a periodically varying shape;
a stationary disk, arranged opposite the moving disk, including
an emitting region and a receiving region, each comprising a second electrode on the stationary disk, able to form a static electric field with the emitting region, the static electric field being modulatable by the reflecting region and able to periodically vary as the moving disk rotates;
a magnet, arranged on the moving disk;
a first magnetic sensor, arranged on the stationary disk, to generate an angle signal under an action of the magnet as the moving disk rotates; and
a signal processing circuit, to determine an incremental rotation angle of the moving disk on a basis of an output of the receiving region, to determine a period of the static electric field on a basis of the angle signal generated by the first magnetic sensor, and to determine an absolute rotation angle of the moving disk on a basis of the period of the static electric field and the incremental rotation angle.

2. The apparatus of claim 1, further comprising:
at least one second magnetic sensor, the at least one second magnetic sensor being arranged on the stationary disk to generate a pulse signal under the action of the magnet as the moving disk rotates, wherein the signal processing circuit is configured to determine a rotation direction of the moving disk on a basis of signals generated by the first magnetic sensor and the at least one second magnetic sensor; and to determine a number of circles of rotation of the moving disk on a basis of the rotation direction of the moving disk and a pulse signal generated by the at least one second magnetic sensor.

3. The apparatus of claim 2, wherein the apparatus comprises at least two second magnetic sensors, the at least two second magnetic sensors being arranged on the stationary disk so as to be spaced apart by a set angle, and each of the at least two second magnetic sensors being configured to generate a pulse signal under the action of the magnet as the moving disk rotates; and wherein the signal processing circuit is configured to determine the rotation direction of the moving disk on a basis of signals generated by the at least two second magnetic sensors.

4. The apparatus of claim 3, wherein the at least two second magnetic sensors are arranged to be spaced apart from the magnet by a set distance in a radial direction.

5. The apparatus of claim 4, wherein the at least two second magnetic sensors are each configured to generate a pulse with a duty cycle of 50% in one circle of rotation of the moving disk.

6. The apparatus of claim 3, wherein the signal processing circuit is configured to cause the first magnetic sensor to be powered by a main power supply only when an absolute rotation angle of the moving disk is being determined.

7. The apparatus of claim 2, further comprising at least two second magnetic sensors, wherein the signal processing circuit is configured to detect at least one of a rising edge and a falling edge of a pulse signal generated by the at least two second magnetic sensor, and is configured to determine a rotation direction of the moving disk on the basis of an angle signal, corresponding to the at least one of the rising edge and the falling edge respectively, generated by the first magnetic sensor.

8. The apparatus of claim 7, wherein the signal processing circuit is configured to cause the first magnetic sensor to be powered only when an angle signal is generated corresponding to the at least one of the rising edge and falling edge, under a condition that the first magnetic sensor is powered by a battery.

9. The apparatus of claim 2, wherein the at least one second magnetic sensor is arranged to be spaced apart from the magnet by a set distance in a radial direction.

10. The apparatus of claim 9, wherein the at least one second magnetic sensor is configured to generate a pulse with a duty cycle of 50% in one circle of rotation of the moving disk.

11. The apparatus of claim 1, wherein the magnet is in a form of a disk, radially magnetized, and arranged on an axis of the moving disk.

12. The apparatus of claim 1, wherein the first magnetic sensor is arranged coaxially with the magnet.

13. The apparatus of claim 1, wherein
the moving disk further comprises another reflecting region, wherein the reflecting region and the another reflecting region complement one another in shape and are arranged differentially;
the stationary disk further comprises another receiving region, wherein the receiving region and the another receiving region are arranged on two sides of the emitting region, the another receiving region is configured to form another static electric field with the emitting region, and the another static electric field is configured to be modulated by the another reflecting region and is configured to periodically vary as the moving disk rotates; and
the signal processing circuit is configured to determine an incremental rotation angle of the moving disk on a basis of the difference between outputs of the receiving region and the other receiving region.

14. A rotation angle measuring method, the rotation angle being a rotation angle of a moving disk relative to a stationary disk, the moving disk being configured to rotate about an axis, and including a reflecting region comprising first electrodes on the moving disk, including a periodically varying shape; the stationary disk being arranged opposite the moving disk and including an emitting region and a receiving region, each comprising a second electrode on the stationary disk, the receiving region being able to form a static electric field with the emitting region, the static electric field being modulatable by the reflecting region and being configured to periodically vary as the moving disk rotates; a magnet being arranged on the moving disk; a first magnetic sensor being arranged on the stationary disk, the first magnetic sensor being configured to generate an angle signal under an action of the magnet as the moving disk rotates; the method comprising:
determining an incremental rotation angle of the moving disk on a basis of an output of the receiving region;
determining a period of the static electric field on a basis of an angle signal generated by the first magnetic sensor; and
determining an absolute rotation angle of the moving disk on a basis of the period of the static electric field and the incremental rotation angle.

15. The method of claim 14, wherein at least one second magnetic sensor is also arranged on the stationary disk, the at least one second magnetic sensor being arranged to generate a pulse signal under an action of the magnet as the moving disk rotates; the method also comprises:
- determining a rotation direction of the moving disk on a basis of signals generated by the first and at least one second magnetic sensors, the first and at least one second magnetic sensors being two selected from the first magnetic sensor and the at least one second magnetic sensor; and
- determining a number of circles of rotation of the moving disk on a basis of the rotation direction of the moving disk and a pulse signal generated by one of the at least one second magnetic sensor.

16. The method of claim 15, wherein at least two second magnetic sensors are arranged on the stationary disk, the at least two second magnetic sensors being arranged to be spaced apart by a set angle, and each of the at least two second magnetic sensors generating a pulse signal under the action of the magnet as the moving disk rotates, wherein the determining of the rotation direction of the moving disk on a basis of signals generated by the at least two magnetic sensors comprises:
- determining the rotation direction of the moving disk on a basis of the order of signals generated by the at least two second magnetic sensors.

17. The method of claim 16, wherein at least two second magnetic sensors are arranged on the stationary disk, and wherein the determining of the rotation direction of the moving disk comprises:
- detecting at least one of a rising edge and a falling edge of a pulse signal generated by the at least two second magnetic sensors, and determining a rotation direction of the moving disk on the basis of an angle signal, corresponding to the at least one of the rising edge and the falling edge respectively, generated by the first magnetic sensor.

18. The method of claim 15, wherein one second magnetic sensor is arranged on the stationary disk, and wherein the determining of the rotation direction of the moving disk on a basis of signals generated by the at least one magnetic sensors comprises:
- detecting at least one of a rising edge and a falling edge of a pulse signal generated by the one second magnetic sensor, and determining a rotation direction of the moving disk on the basis of an angle signal, corresponding to the at least one of the rising edge and the falling edge respectively, generated by the first magnetic sensor.

19. The method as claimed of claim 15, wherein an absolute rotation angle of the moving disk is determined only when a main power supply is turned on; and an incremental rotation angle and the number of circles of rotation of the moving disk are determined continuously.

20. The method of claim 14, wherein the moving disk includes another reflecting region, wherein the reflecting region and the another reflecting region complement one another in shape and are arranged differentially; the stationary disk also comprises another receiving region, wherein the another receiving region and the another receiving region are arranged on two sides of the emitting region, the another receiving region being configured to form another static electric field with the emitting region, and the another static electric field being modulatable by the another reflecting region and being configured to periodically vary as the moving disk rotates;
- the determining of the incremental rotation angle of the moving disk on a basis of an output of the receiving region including: determining the incremental rotation angle of the moving disk on a basis of the difference between outputs of the receiving region and the another receiving region.

* * * * *